73-632 SR

XR 3,740,494

United States (x 13/632

Dunand et al.

[11] 3,740,494

[45] June 19, 1973

[54] ELECTROMECHANICAL VIBRATION PICK-UPS AND RECORD PICK-UPS WITH FIELD EFFECT TRANSISTORS

[75] Inventors: Andre Dunand; Jacques Jarry; Maurice Gloanec, all of Paris, France

[73] Assignee: Sescosem-Societe Europeene de Semiconductors et de Microelectronique, Paris, France

[22] Filed: Nov. 22, 1971

[21] Appl. No.: 200,780

[30] Foreign Application Priority Data

Nov. 24, 1970 France .............................. 7042166

[52] U.S. Cl. ..............................179/100.41 K; 73/88.5 SD; 179/100.41 T, 100.41 V

[51] Int. Cl............................................ H04r 21/04

[58] Field of Search......... 179/100.41 K, 100.41 V, 179/100.41 T, 100.41 P, 110 B, 110 D; 73/88.5 SD

[56] References Cited

UNITED STATES PATENTS

| | | | |
|---|---|---|---|
| 3,392,358 | 7/1968 | Collins | 179/100.41 V |
| 3,433,487 | 3/1969 | Kawaguchi et al. | 179/100.41 V |
| 3,609,252 | 9/1971 | Broce et al. | 179/100.41 T |
| 3,283,271 | 11/1966 | Persson | 179/100.41 V |
| 3,351,880 | 11/1967 | Wilner | 179/100.41 V |
| 3,201,527 | 8/1965 | Aherns | 179/100.41 K |
| 3,215,785 | 11/1965 | Cuetko et al. | 179/100.41 K |

*Primary Examiner*—Raymond F. Cardillo, Jr.
*Attorney*—Cushman, Darby & Cushman

[57] ABSTRACT

A new electromechanical vibration pick-up device is provided.

A transducer type pick up device comprises a rigid component carrying a pick-up head. The component is rendered flexible by insertion into a gap of said component, of a semiconductor chip flexible in one direction only. Said semiconductor converts mechanical stresses into electrical signals received by adequate electric means.

7 Claims, 6 Drawing Figures

3740494

Inventors
ANDRE DUNAND
JACQUES JARRY
MAURICE GLOANEC
By Cushman, Darby & Cushman
Attorneys Inventors
ANDRE DUNAND
JACQUES JARRY
MAURICE GLOANEC
By
Cushman, Darby & Cushman
Attorneys Inventors
ANDRE DUNAND
JACQUES JARRY
MAURICE GLOANEC
By
Cushman, Darby & Cushman
Attorneys

ELECTROMECHANICAL VIBRATION PICK-UPS AND RECORD PICK-UPS WITH FIELD EFFECT TRANSISTORS

The present invention relates to electromechanical vibration pick-ups and in particular to record pick-ups (mono or stereo).

In record pick-up devices, a pick-up is designed to follow the grooves in a record disc and to translate the indentations generally carried by the flanks of said grooves, into transverse movements in relation to the grooves.

The latter acts upon a transducer which converts the mechanical stresses into electrical signals.

Devices using a transducer made of a semiconductor whose conductivity is modified by the mechanical stresses are known in the art. In particular, the device which forms the subject of U.S. Pat. application Ser. No. 84369 (JUND et al.) filed Oct. 27, 1970 and now abandoned by the Applicant utilizes a field-effect MOS transistor assembled on a stylus holder made for example of acrylic resin.

However, although the pick-up device described in the aforestated patent application presents excellent qualities of fidelity of reproduction and is capable of reproducing a range extending from the highest to the lowest audible frequencies, it has deficiencies as far as sensitivity and decoupling between stereo channels are concerned. As a matter of fact, the embodiment described involves the attachment of the substrate of the semiconductor to a thinned portion of the pick-up (a flat). The assembly of the flat and the substrate does not constitute the best approach to the ideal geometric and mechanical arrangement, as far as sensitivity and decoupling are concerned.

The invention enables the drawbacks referred to hereinbefore to be overcome and provides a structure which approaches as close as possible to the desired ideal conditions.

According to the invention an electromechanical vibration pick-up device comprises : a pick-up head ; a pick-up device comprising at least a first and a second rigid portions and at least a first flexible semiconductor substrate inserted between said first and second portions ; a field-effect transistor integrated in said substrate ; and electrical means converting variations of resistivity generated by bending deflections of said substrate into electrical currents.

The invention and its advantages will be better understood from a consideration of the ensuing description by reference to the attached figures in which.

Figure 4:
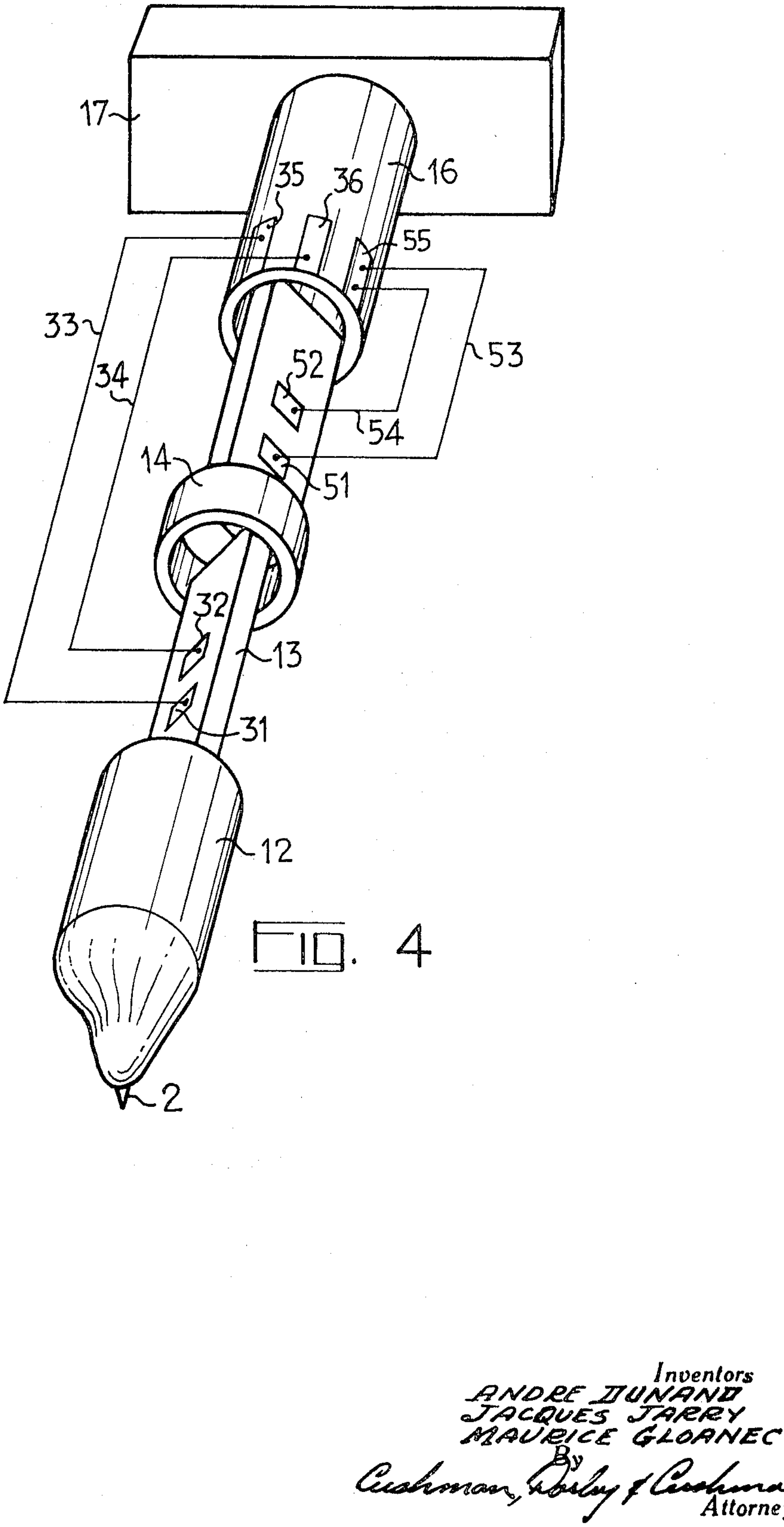
FIG. 4 illustrates a perspective view of an embodiment of the pick-up in accordance with the invention.
Figure 5:
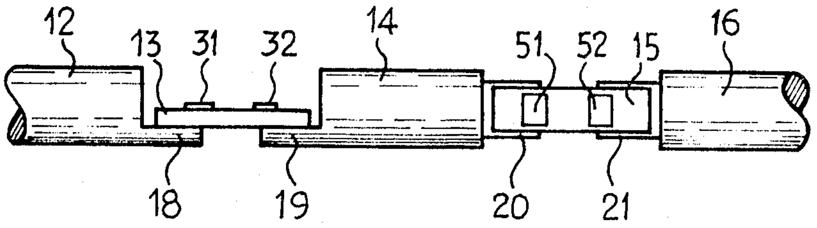
Figure 6:
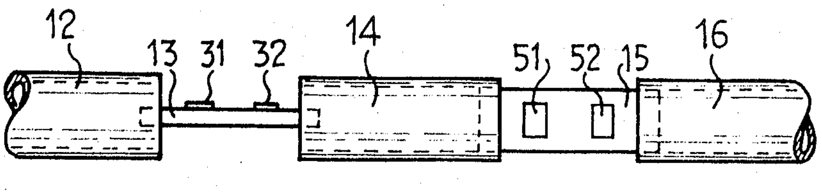

FIGS. 5 and 6 illustrate in section two possible arrangements of the components 13 and 15 of FIG. 4.

Figures 1, 2, 3:
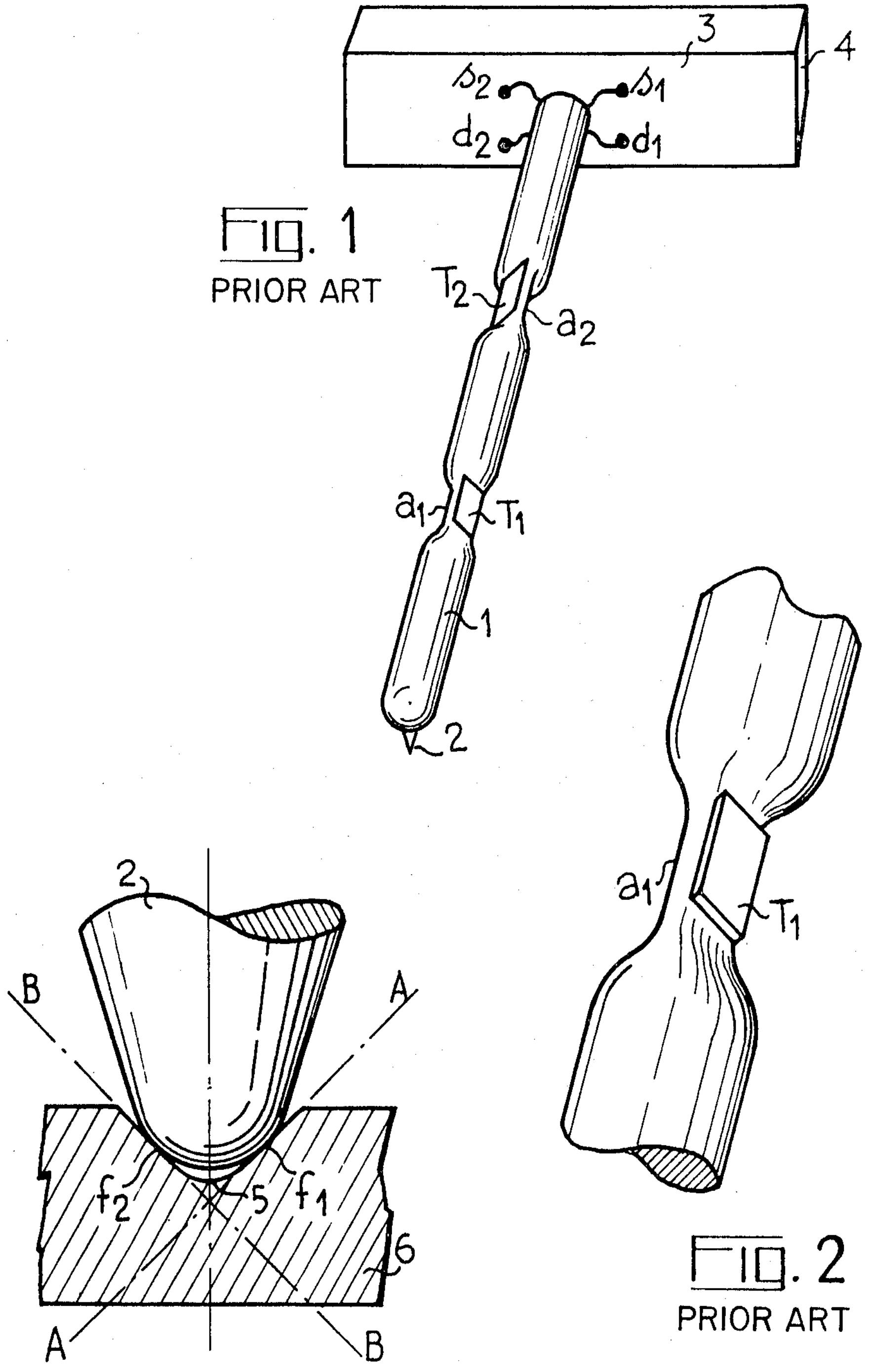
FIG. 1 PRIOR ART, FIG. 2 PRIOR ART, FIG. 3 PRIOR ART
FIG. 1 illustrates a perspective view of one embodiment, of the pick-up holder as described in the patent application cited above.
FIG. 2 illustrates an enlarged perspective view of the component 1 shown in FIG. 1.
FIG. 3 illustrates an enlarged perspective view of the pick up 2 and the flanks of a groove in a stereo record.

The electromechanical pick-up device of FIG. 1 is of the stereo type ; it comprises two transducers T1 and T2 attached to the flats $a_1$ and $a_2$ of a flexible component 1. This embodiment, which falls within the scope of the aforesaid patent application, comprises a component 1 of elongated form one end of which is embedded in the wall 3 of a housing and the other end of which carries a pick-up head 2 (sapphire or diamond).

The transducers T1 and T2 are field-effect transistors, of the MOS type for example, whose sources and drains are respectively connected through leads which have not been shown, to the terminals $s_1$, $d_1$, $s_2$, $d_2$ on the wall 3 of a block 4. The gate of each transistor is connected to its respective source by a direct metal connection (not shown).

FIG. 3 in the one case provides a perspective view of the tip of a pick-up head 2, and in the other a section through a stereo record groove 6 whose flanks $f_1$ and $f_2$ are inclined at 45° to either side of a longitudinal central plane perpendicular to the plane of section. The planes marked by the lines AA and BB, which contain the flanks $f_1$ and $f_2$, are perpendicular to one another. The pick-up head 2, because of the presence of the indentations in these flanks, is subjected to vibrations in two mutually perpendicular directions.

It will be readily appreciated, from a consideration of FIG. 1, that the planes of the semiconductor chips $T_1$ and $T_2$ are perpendicular to one another, this ensuring maximum decoupling, compatible with this embodiment, between the two stereo channels.

In the case of the invention, as shown FIG. 4, the pickup device is divided into several components which are, successively :

- a nose 12 carrying the pick-up head 2 and semiconductor substrate 13 ;
- a ring 14 ;
- a semiconductor substrate 15 identical to that 13 but located in a plane perpendicular to the latter ;
- a sleeve 16 embedded in a block 17 to damp mechanical vibrations.

The pick-up head 2 is a "needle," of sapphire or diamond, attached to a beam 12 by a rigid mechanical means, for example by soldering or sticking.

The beam 12 has a length of about 1 cm and a cross sectional area in the order of some few square millimeters and is made of a material insuring its rigidity ; it is for example made of aluminum. This part of the pick-up device has a substantial rigididy in all directions of bending, whereas the case is the opposite with the chips 13 and 15 which have a low rigidity in a direction perpendicular to their own plane.

Chips 13 and 15 are tied to each other by means of ring 14. Because of its cylindrical shape it has high rigidity, in all directions of bending.

The sleeve 16, which provides the mechanical connection between the chip 15 and the block 17, has similar mechanical characteristics to those of the beam portion 12. It has metallized areas 35, 36, 55, and 56 (the last being masked by the perpective).

The metallized areas 35 and 36 are connected by conducting wires 33 and 34 to the metallized areas of the output terminals 31 and 32 of the semiconductor 13. The metallized areas 55 and 56 are connected by similar wires 53 and 54 to the terminals 51 and 52 of the semiconductor 15.

In the embodiment described by way of example here, the electromechanical transducer is a field effect transistor circuit integrated in a rectangular semiconductor wafer or substrate, the plane of one large face of which is parallel to the groove flank whose indentations are to be detected. Assuming the flanks to be at 45° to the vertical plane tangential to the groove at the point of contact between it and the pick-up head the semiconductor wafers will likewise be respectively in planes parallel to the groove flanks whose indentations are to be detected. As far as the "drain-source" current lines are concerned, these are substantially parallel to the large faces of the substrates, that is to say to the flanks of the grooves. Those skilled in the art will be aware that this kind of arrangement enables maximum decoupling to be achieved between the two stereo channels.

The attachment of the semiconductor wafers to the other components of the pick-up device should be very rigid and robust. Two other modes of embodiments are respectively shown in FIGS. 5 and 6.

In the case of FIG. 5, the components 12 and 14 of the pick-up device are machined at those of their ends intended for the fixing of the chips 13 and 15. Shores are formed, shaped and gilded, in order to enable the previously gilded substrates to be soldered in position by the formation of a eutectic gold-silicon alloy. The chip 13 is soldered over approximately a third of its length, to the opposite shore 18 and 19. The same applied to the chip 15 which is soldered to the shores 20 and 21.

In the case of FIG. 6, the components 12, 14 and 16 have been recessed centrally to enable the ends of the chips 13 and 15 to be inserted for a distance of around one-third of their total length, in each case.

The assembly is consolidated by bonding, utilizing for example a polymerizable synthetic resin.

By way of a non-limitative example, some actual quantities relating to the device in accordance with the invention, will be listed hereinafter :

- mass of the pick-up head on its own : around 10 mg ;
- length : around 2 cm ;
- sizes of wafers in the order of $1 \times 1.5 \times 0.1$ mm ;
- mechanical compliance : in the order of $10^{-5}$ cm.dynes$^{-1}$ ;
- signal voltage for a play-back speed of 5 cm/sec at 1,000 C/s : 50 mV ;
- cross-talk between stereo channels at the pick-up head, in the order of 20 dB.

Because of the flexibility of the pick-up device, the pick-up stylus can follow impressions which are 5 to 10 times deeper than is possible with piezoelectric chips.

The sensitivity is around 5 times better than the embodiment disclosed in the aforesaid patent application and the signal to noise ratio is improved in the same degree (around 14 dB).

Within the context of the invention, it is possible to employ as transducers integrated circuits comprising for example in addition to the sensitive element, amplifier elements which are made up of material which may either be silicon or a flexible material part of which is semiconductive.

What is claim is :

1. An electromechanical vibration pick-up assembly comprising : a pick-up head ; a pick-up device comprising at least a first and a second rigid beams coextensive to each other, said first and second beams being separated by a gap ; at least a first flexible semiconductor substrate linking said first and second beams through said gap ; at least a field effect transistor having a source, a gate, a drain and a channel integrated in said substrate, said gate being connected with said source ; and electrical means comprising said transistor, converting into electrical signals the variations of current flowing in said channel and affected by the bending deflection of said substrate under the influence of the pick-up operation.

2. A device as claimed in claim 1, wherein said substrate is flexible only in one direction determined by the displacements of said pick-up head.

3. A device as claimed in claim 1, wherein said field-effect transistor is of MOS type.

4. A device as claimed in claim 1, wherein integrated circuits are formed in said substrate.

5. An electromechanical vibration pick-up device as claimed in claim 1, further comprising a third beam, a second semiconductor substrate being inserted between said second and third beams, the planes of said first and second substrates being perpendicular to one another and inclined at 45°, with respect to a vertical plane.

6. A device as claimed in claim 5, wherein a second field effect transistor is integrated in said second substrate.

7. A device as claimed in claim 6, wherein said second field-effect transistor is of MOS type.

* * * * *